(12) United States Patent
Dean, Jr. et al.

(10) Patent No.: US 7,086,847 B2
(45) Date of Patent: Aug. 8, 2006

(54) GUIDE BLOCK ASSEMBLY FOR MOLDING MULTI-FIBER CONNECTORS

(75) Inventors: David L. Dean, Jr., Hickory, NC (US); Nick A. Felkenes, West Carrollton, OH (US); Alan J. Malanowski, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/868,699

(22) Filed: Jun. 15, 2004

(65) Prior Publication Data

US 2004/0240836 A1    Dec. 2, 2004

Related U.S. Application Data

(63) Continuation of application No. 09/864,497, filed on May 24, 2001, now Pat. No. 6,767,199, which is a continuation-in-part of application No. 09/621,226, filed on Jul. 21, 2000, now Pat. No. 6,663,377.

(51) Int. Cl.
  *B29C 33/76*    (2006.01)

(52) U.S. Cl. ............... 425/190; 425/468; 425/577; 249/177

(58) Field of Classification Search ............... 425/190, 425/192 R, 577, 468; 249/176, 177
See application file for complete search history.

(56) References Cited

U.S. PATENT DOCUMENTS

| | | | |
|---|---|---|---|
| 5,269,998 A | 12/1993 | Takagi et al. | 264/328.1 |
| 5,441,397 A | 8/1995 | Eriksen et al. | 425/116 |
| 5,664,039 A | 9/1997 | Grinderslev et al. | 385/65 |
| 5,707,565 A | 1/1998 | Suzuki et al. | 264/1.25 |
| 5,780,079 A | 7/1998 | Lee | 425/577 |
| 5,786,002 A | 7/1998 | Dean et al. | 425/183 |
| 5,815,621 A | 9/1998 | Sakai et al. | 385/80 |
| 6,074,577 A | 6/2000 | Katsura et al. | 264/1.25 |
| 6,287,017 B1 | 9/2001 | Katsura et al. | 385/59 |
| 6,340,247 B1 | 1/2002 | Sakurai et al. | 385/78 |
| 6,342,170 B1 | 1/2002 | Yang | 264/1.25 |

OTHER PUBLICATIONS

Yang, H. and Vasile, M.; *Fabrication of single-mode optical fiber ferrule mode insert with twelve channels*; Part of the Symposium on Design, Test and Microfabrication of MEMS and MOEMS; Paris, France; Mar./Apr. 1999; SPIE vol. 3680; pp. 848-853.

Yang, H.W.; *Development and Realization of a Single-Mode Optical Fiber Ferrule Mold Insert with Twelve Channels*; A Dissertation Presented in Partial Fulfillment of the Requirement for the Degree Doctor of Engineering; College of Engineering and Science Louisiana Tech University; May 1998.

*Primary Examiner*—James P. Mackey
(74) *Attorney, Agent, or Firm*—Christopher C. Dremann

(57) ABSTRACT

A guide block assembly for aligning and retaining fiber bore forming pins and guide pin bore forming pins in precise relation to each other during the molding of a multi-fiber ferrule includes a unitary member defining at least one fiber bore and at least one guide pin bore. Each fiber bore, and optionally each guide pin bore, is formed by creating a starter hole using a first electric discharge machining (EDM) wire and enlarging the starter hole using a second EDM wire. Each fiber bore has a length to diameter ratio of between approximately 3:1 to 10:1, more preferably between approximately 4:1 to 8:1, and most preferably approximately 6:1. The guide block assembly may further include a cavity behind the fiber bore and a front face that forms a non-rectilinear surface on the face of the ferrule. The unitary block assembly contains fewer parts and is less expensive to manufacture.

12 Claims, 9 Drawing Sheets

GUIDE BLOCK ASSEMBLY FOR MOLDING MULTI-FIBER CONNECTORS

CROSS-REFERENCE TO RELATED APPLICATIONS

This application is a continuation of U.S. application Ser. No. 09/864,497, filed on May 24, 2000, now U.S. Pat. No. 6,767,199, which is a continuation-in-part of U.S. application Ser. No. 09/621,226, filed on Jul. 21, 2000, now U.S. Pat. No. 6,663,377.

FIELD OF THE INVENTION

The present invention relates generally to an apparatus and a method for molding multi-fiber optical connector ferrules.

BACKGROUND OF THE INVENTION

A fiber optic cable may include one or more optical fibers capable of transmitting audio, video or other information. Examples of optical fibers are disclosed in U.S. Pat. Nos. 5,561,730 and 5,457,762. Fiber optic cables are laid over long distances and require optical connectors or ferrules to link discrete segments of the optical fibers. As used herein, the term "ferrule" refers to a plug assembly or a structure that receives a terminal end of an optical fiber or optical fiber ribbon and then abuts against an opposing ferrule to align corresponding optical fiber or ribbon for transmission of an optical signal or signals.

An example of an optical ferrule is disclosed in U.S. Pat. No. 5,214,730 to Nagasawa et al. FIG. 1 illustrates an optical ferrule similar to that depicted in Nagasawa, and shows multi-fiber ferrules 3 and 3' connected to optical fiber ribbons 1 and 1', respectively. Ribbon 1 comprises multiple optical fibers 2 to be aligned with corresponding optical fibers 2' (not shown) from ribbon 1'. Ferrule 3 defines a plurality of optical fiber bores adapted to receive fibers 2 and two guide pin bores 4 adapted to receive guide pins 6. Guide pins 6 align ferrule 3 with ferrule 3', when the two ferrules are connected to each other to align optical fibers 2 and 2' to optimize optical transmission.

During a typical molding process to produce ferrules 3, bore forming pins are inserted through the mold cavity to create the guide pin bores and the optical fiber bores in the ferrules. Molten plastic is then injected into the mold cavity, and after the plastic solidifies sufficiently the pins are withdrawn to form the bores in the ferrules to receive the optical fibers and guide pins. Prior to connecting to ferrule 3, optical ribbon 1 is stripped of its outer matrix coating and its buffer layer to expose fibers 2. The individual fibers 2 are inserted into the fiber bores on ferrule 3. Various well-known techniques are used to permanently affix fibers 2 to ferrule 3. End faces 5 and 5' of ferrules 3 and 3' are then polished along with the exposed ends of fibers 2. A pair of guide pins 6 is then inserted into guide holes 4 to connect and align the ferrules. A spring clip (not shown) may be used to clamp the two ferrules together.

There is a premium placed on the precise alignment of opposing optical fibers at a connection to minimize signal losses, which diminishes the quality of the optical transmission through the connection. The precision of aligning opposing optical fibers is more sensitive with multi-fiber ferrules due to the presence of multiple optical fibers and to each fiber's location relative to each other and relative to the guide pins within the ferrules. Additionally, when an optical fiber is a single-mode fiber, i.e., the optical signal is transmitted through only a small portion of the fiber, the alignment needs to be even more precise.

A conventional ferrule molding method uses a series of V-shaped open grooves machined into a block of the mold cavity to retain the bore forming pins inserted into the mold cavity. FIG. 2 shows a cross-sectional view of this conventional molding method, where fiber bore forming pins 7 and guide pin bore forming pins 8 are shown disposed in V-shaped grooves 9. The disadvantages of this or similar open groove constructions include a tendency of the pins 7 and 8 to float within the V-shaped grooves in the direction of arrow A during the molding process. This float contributes to imprecise alignment of the bores formed in the molded ferrule. Additionally, after repeated uses of a mold cavity with this groove construction, flash begins to build up in areas indicated by B. This flash build up requires frequent cleaning of the grooves. Also, as can be seen, pins 7 contact the V-shaped grooves only along two lines of contact and thus all the friction forces of the repeated insertion and removal of the pins are imparted along these two lines of contact, thereby causing uneven wear along the sides of the V-shaped groove. This causes the alignment of the pins to become progressively more imprecise.

The drawbacks of the molding process with the V-shaped grooves have been addressed by the "small hole technology" disclosed by U.S. Pat. No. 5,786,002 to Dean et al. As shown in FIG. 3, Dean et al. discloses a guide block assembly comprising a plurality of fiber bore blocks 12, at least two guide pin bore blocks 14 and a plurality of spacer blocks 16 arranged in any desirable configuration in a mold cavity. Each fiber bore block 12 defines a small hole or bore 18 adapted to receive during the molding process a pin having the diameter of an optical fiber, and each guide pin bore blocks 14 defines a bore 19 adapted to receive a pin having a diameter of a guide pin. Molten plastic is injected into the mold cavity and the pins are thereafter withdrawn from the holes and the mold cavity to form receptacles in the ferrules to receive optical fibers 2 or guide pins 6. The use of bores more precisely retains the pins during the molding process than the use of V-shaped open grooves. Dean et al. resolves the known drawbacks from the V-shaped open groove molding technique, and provides the additional benefits of establishing precise spatial relationship among the modular blocks, by machining the surfaces of the adjoining blocks.

Dean et al., however, requires the fabrication of multiple blocks, which increases the costs and may become less economical when used to fabricate ferrules for a small number of optical fibers. Hence, there remains a need in the art for a molding apparatus that has the advantages realized in the Dean et al. '002 patent, but requires fewer components and is more economical to produce.

SUMMARY OF THE INVENTION

Accordingly, it is an object of the present invention to provide a device for molding multi-fiber ferrules using small hole technology.

Another object of the invention is to minimize the costs of fabricating a device for molding multi-fiber ferrules.

Yet, another object of the invention is to provide a device capable of precisely aligning and retaining the bore forming pins during the molding of multi-fiber ferrules.

These and other objects of the present invention are accomplished by a guide block assembly for aligning and retaining at least one fiber bore forming pin and at least one guide pin bore forming pin during the molding of a ferrule.

The guide block assembly comprises a unitary member defining at least one fiber bore and at least one guide pin bore. The fiber bore is created by an electric discharge machining (EDM) wire. One starter hole is created for each bore with the EDM wire attached at one end to an EDM machine. The starter hole is then enlarged by a second EDM wire connected to an EDM machine at both ends.

The ratio between the length of the fiber bore to its diameter is preferably from approximately 3:1 to 10:1, more preferably from approximately 4:1 to 8:1, and most preferably approximately 6:1. In accordance with another aspect of the invention, the unitary guide block assembly has a front face, wherein the front face is altered to form a non-rectilinear surface. The non-rectilinear surface can be a curve surface, a stepped surface, an angled surface, or a pedestal surface, among others.

In accordance with other aspects of the invention, an open cavity behind the fiber bore is provided to reduce the flash build-up, and longitudinal slots are formed around the fiber bore to reduce the wear and tear on the bore forming pins.

In accordance with another aspect of the invention, a method for fabricating a guide block assembly defining at least one fiber bore for aligning and retaining at least one fiber bore forming pin during a molding of a ferrule is provided. This method comprises the steps of securing a blank to a wire electric discharge machining (EDM) machine, forming a starter hole in said blank with a wire attached at one end to the EDM machine, and enlarging said starter hole to a predetermined size and dimension of the fiber bore. The enlarging step may comprise the steps of threading a second wire through the starter hole, and connecting both ends of the second wire to an EDM machine (which may be a different EDM machine) to enlarge the starter hole. This method may also comprise the step of forming a non-rectilinear surface on a front surface of the guide block assembly before or after the fiber bore is formed.

BRIEF DESCRIPTION OF THE DRAWINGS

The invention is illustrated by way of example in the accompanying drawings, in which.

DETAILED DESCRIPTION OF THE INVENTION

Figure 4:
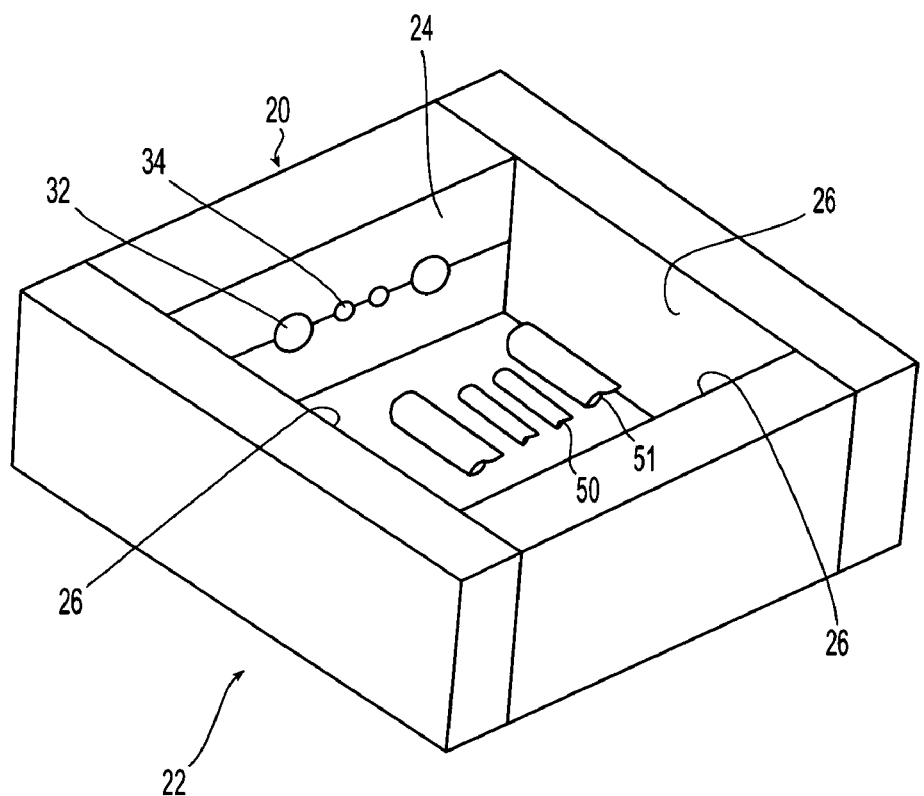
FIG. 4 is a perspective view of a representative arrangement of a mold cavity environment illustrating a preferred embodiment of a guide block assembly of the present invention.

Referring to the drawings, wherein reference numbers are used to designate like parts, FIG. 4 shows one preferred embodiment of the guide block assembly 20, disposed in a mold cavity 22 to illustrate the environment for the guide block assembly 20. Assembly 20 has a mold face 24, which can serve as one of the walls 26 defining mold cavity 22.

Figure 5:
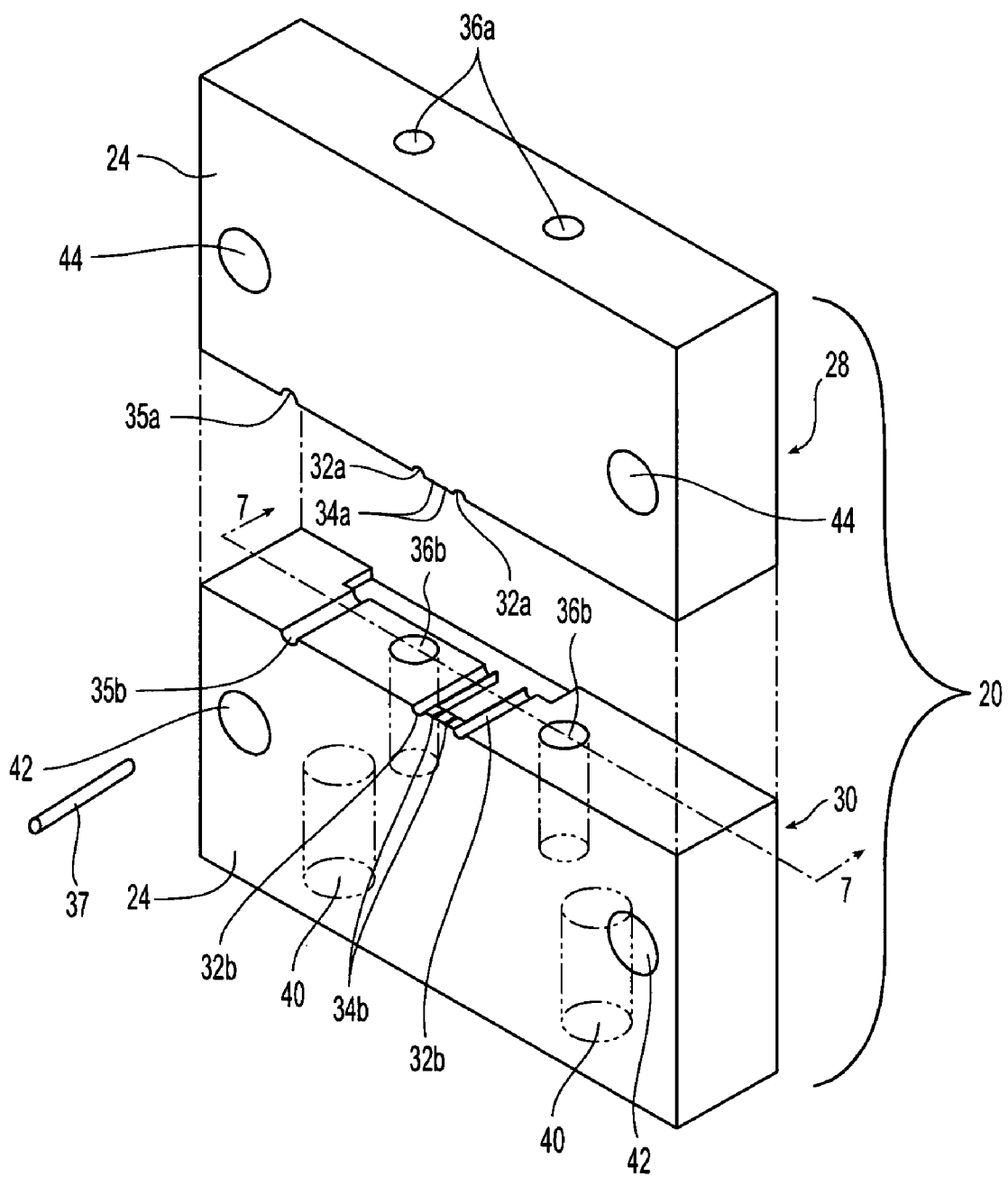
FIG. 5 is an exploded view showing the top and bottom portions of the guide block assembly of the present invention.

Referring to FIG. 5, assembly 20 comprises a top portion 28 and a bottom portion 30. Top portion 28 defines on its lower surface a number of semi-circular guide pin bore grooves 32a and a number of semi-circular fiber bore grooves 34a. As illustrated by FIG. 5, fiber bore grooves 34a are positioned on the inside of the guide pin bore grooves 32a. Grooves 32a and 34a are sized and configured to match with semi-circular guide pin bore grooves 32b and semi-circular fiber grooves 34b located on the top surface of bottom portion 30, such that when the top and bottom portions are assembled together, the semi-circular fiber bore grooves 34a and 34b are joined to form fiber bores 34 and semi-circular guide pin bore grooves 32a and 32b are joined to form guide pin bores 32. The top portion 28 also defines two vertical channels 36a corresponding to vertical channels 36b defined on the bottom portion 30, such that conventional fasteners such as nuts and bolts may clamp the top portion 28 to the bottom portion 30.

Additionally, the top and bottom portions 28 and 30 may have a pair of corresponding key pin grooves 35a and 35b, respectively, as illustrated in FIG. 5. Key pin grooves 35a and 35b together form key pin bore 35 adapted to receive a key pin when the top and bottom portions 28 and 30 are assembled. The key pin 37 is inserted into bore 35 to align the top portion to the bottom portion. The bottom portion may also have receiving channels 40 disposed on its bottom surface. Receiving channels 40 are sized and dimensioned to receive corresponding bosses on the mold cavity (not shown), such that the guide block assembly 20 can be securely affixed onto the mold cavity. Also, top and bottom portions 28 and 30 may also have through holes 42 and 44, whose function is described below.

Figure 6:
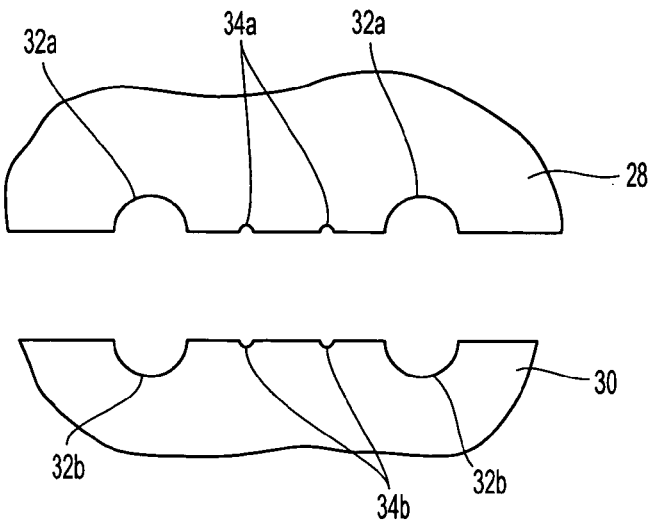
FIG. 6 is an enlarged front view showing an array of fiber bores and guide pin bores of the guide block assembly of the present invention.
Figure 7:
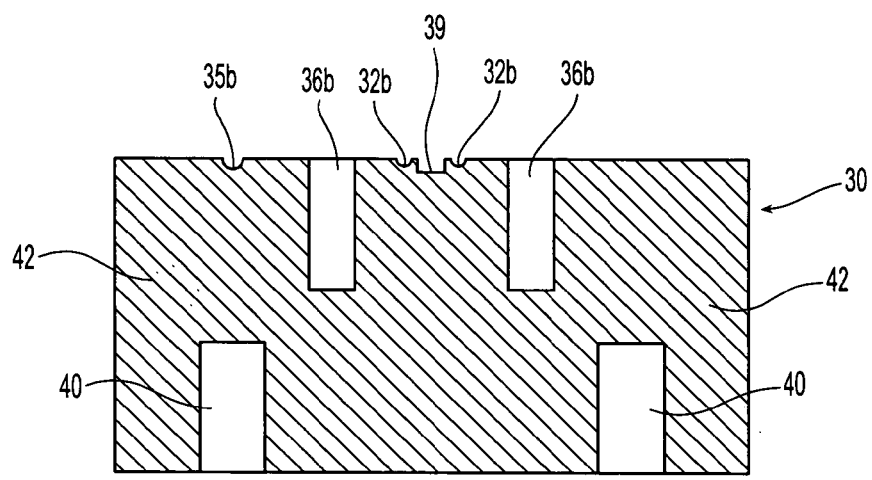
FIG. 7 is a cross-sectional view of the bottom portion of the guide box assembly along line 7—7 shown in FIG. 5.

FIG. 6 is an enlarged exemplary view of the assembly 20 showing the relative dimension and location of guide pin bore grooves 32a and 32b in relation to fiber grooves 34a and 34b. Although, only two sets of guide pin bore grooves and fiber grooves are shown, any number of grooves can be defined by assembly 20. FIG. 7 shows a cross-sectional view of bottom portion 30 illustrating by example the location of the guide pin bore grooves 32b, channels 36b and key pin groove 35b in relation to each other.

Figure 8:
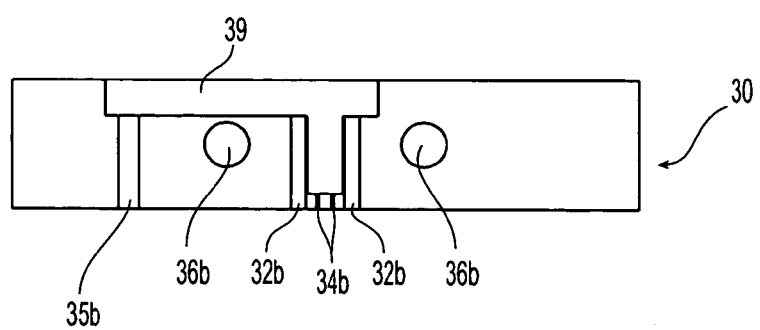
FIG. 8 is a top view of the bottom portion of the guide block assembly showing another aspect of the invention.

In accordance with another aspect of the invention illustrated in FIG. 8, the length of the fiber bores 34 is kept relatively short relative to its diameter, and an open cavity or space 39 is provided behind the bores 34, such that the molding residue can be pushed through the bores on repeated molding cycles and collect in the open cavity or space 39 instead of clogging the fiber bores. While the open cavity or space 39 is illustrated on bottom portion 30, it may also be on the top portion 28 or both. The preferred ratio between the length and diameter of the fiber bore is approximately between 3:1 and 10:1; the more preferred ratio is approximately between 4:1 to 8:1; and the most preferred ratio is approximately 6:1.

Figure 9:
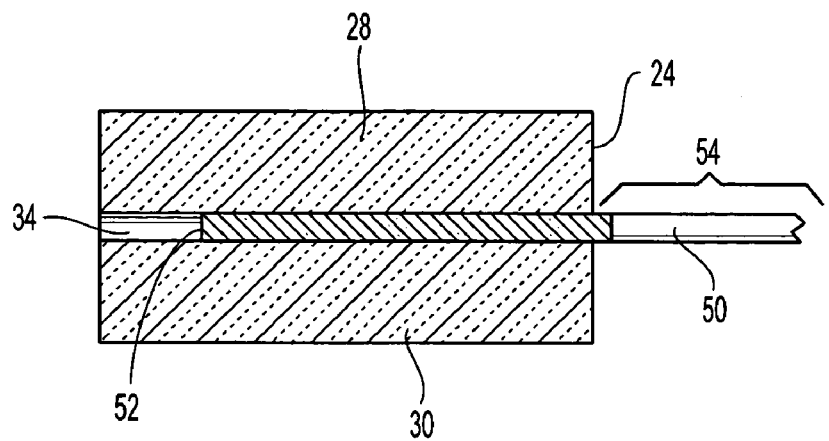
FIG. 9 is a longitudinal cross-sectional view of a fiber bore with a fiber bore forming pin inserted therein.

Guide block assembly 20 is configured to retain a plurality of fiber bore forming pins 50 receivable in fiber bores 34 and retain guide pin bore forming pins 51 receivable in guide pin bores 32, as shown in FIG. 4. Any suitable jig, not shown, can be used to hold and to move pins 50 and 51 into and out of bores 34 and 32, respectively. During the molding of a multi-fiber ferrule, the pins are inserted into the bores and the molding material is injected into the mold cavity formed in part by walls 24 and 26 around the pins. For example, as shown in FIG. 9, the distal end portion 52 of a representative fiber bore forming pin 50 is partially inserted into fiber bore 34 and molding material is injected into mold cavity 22 and covers mold zone 54 of fiber bore forming pin 50 outside of bore 34. After the mold material sets, the pins are retracted to leave behind a plurality of molded bores in the ferrules. Fiber bore forming pins 50 will create a number of fiber bores sized and dimensioned to receive optical fibers in close tolerance. Since the location of the bores 32 and 34 can be precisely machined as described below, and the pins 50 and 51 are held in these precisely positioned bores during the molding process, the molded bores in the ferrules created by the withdrawal of the pins are also precisely positioned to receive the optical fibers and guide pins, especially at the front face 24 of assembly 20. It should be noted that the front face of the ferrule would be formed at the front face 24.

Fiber bore forming pins 50 may be the actual fibers when the ferrules are molded directly around the fibers. As shown in FIGS. 6–8, the guide pin bores 32 and guide pin bore forming pins 51 typically create larger diameter molded guide pin bores than the molded fiber bores to receive the guide pins to align two opposing multi-fiber ferrules. The shape of the guide bore forming pins 51 and guide pin bores 32 is shown to be circular. This shape, however, can be any shape, such as oval, triangular or polygonal.

Figure 1:
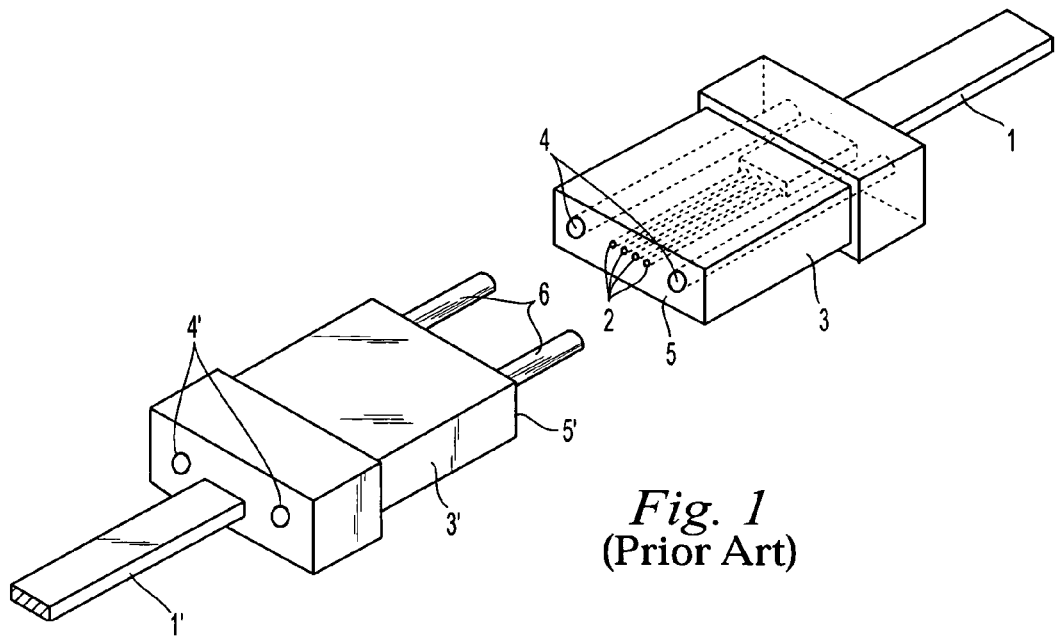
FIG. 1 is a perspective view of a pair of conventional multi-fiber optical connector ferrules.
Figure 2:
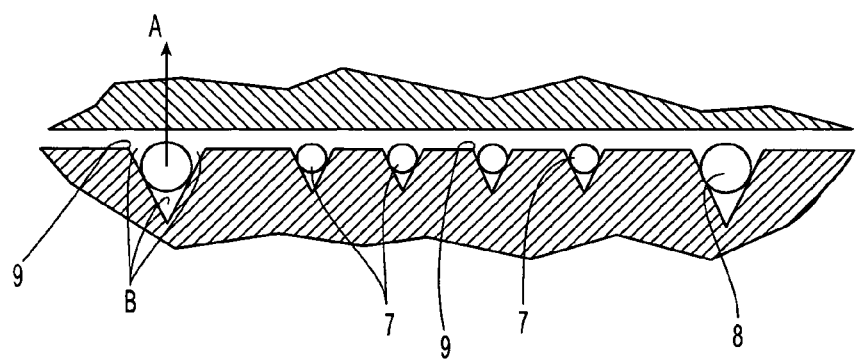
FIG. 2 is a cross-sectional view of a conventional V-shaped open groove guide block assembly.
Figure 3:
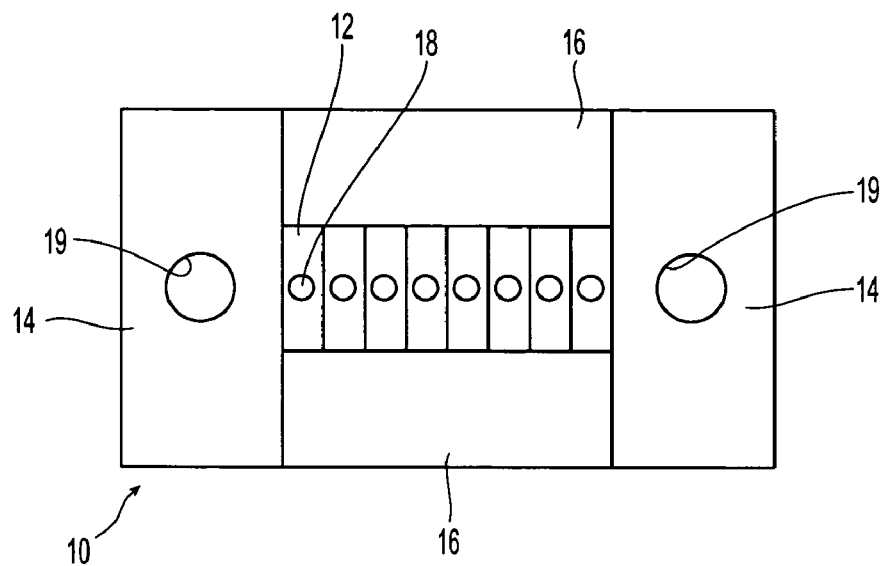
FIG. 3 is front view of another prior art guide block assembly.

The present invention is directed to an apparatus and method to precisely arrange the fiber bore forming pins and the guide pin bore forming pins relative to each other in such a way that the precision is repeatable over a large number of molding cycles. As discussed in the background of the invention, the method of arranging the bores with V-shaped grooves as shown in FIG. 2 suffers from floating of pins, flash build up, and premature and uneven wear of the guide block assembly. By using pre-arranged bores in the guide block assembly and insertable pins, float and uneven wear are reduced and flash build up is substantially eliminated. Specifically, bores 32 and 34 provide less room than the V-shaped open grooves for the floating of the pins 50 and 51 during the molding process. Furthermore, by providing bores the contact between the pins and the bores is spread out over the circumferential contact surface between the bores and the pins, thereby decreasing wear on the bores.

Additionally, by adopting the preferred range of ratios between the length and diameter of the fiber bore 34 and by providing an open cavity 39 behind the fiber bores 34 as shown in FIG. 8, the clogging problem is substantially reduced.

Also by having only a limited number of components, e.g., two portions 28 and 30 in the above-described preferred embodiment, the present invention reduces the costs of fabricating the guide block assembly over the guide block assembly discussed in Dean et al., which comprises a relatively high number of blocks.

In another aspect of the present invention, the bottom surface of the top portion 28 of the guide block assembly 20 and the top surface of the bottom portion 30 are mirror images of each other. When the two portions are clamped or bolted face-to-face together, any remaining misalignment after the key pin 37 in inserted into the key pin bore 35 can be readily detected. Such misalignment would make the diameter of the bores in the guide block assembly smaller in the direction from the mold face 24 toward the back of the assembly, when the grooves 34a and 34b are aligned at the mold face but misaligned elsewhere. A simple lapping process performed on the bore can readily remove any such misalignment. The lapping process comprises covering a precision gauge wire having a diameter smaller than the bore with a lapping compound, e.g., an abrasive compound such as one-quarter micron diamond grit, and then using the precision gauge wire with the lapping compound into the bore to remove any misalignments.

The guide block assembly 20 of the present invention can be manufactured by machining the semi-circular grooves into a metal or ceramic block using known precision grinding techniques. Preferably, the top and bottom portions 28 and 30 can be manufactured by an electric discharge machining (EDM) process. A precision wire EDM machine, or more preferably a submersible wire EDM machine, removes metals from metal blocks by creating thousands of electrical discharges per second that flow between a wire and the metal blocks, vaporizing metal in the controlled area. In the preferred submersible wire EDM machine, a zinc-coated brass, molybdenum or tungsten wire of approximately 0.0005 to 0.003 inch in diameter is submerged in a tank of dielectric fluid, such as deionized water, along with the metal blocks. As the wire is moved relative to the metal blocks, semi-circular grooves are formed on the blocks. Typically, eight to twelve passes from the EDM wire can create the preferred fiber pin groove. The motion of the wire may be controlled by any commercially available computer numerical control (CNC) software. A detailed discussion the EDM processes is provided in the Machinery's Handbook, by E. Oberg et al, (Industrial Press, 1996)($25^{th}$ edition) at page 1266. This discussion is hereby incorporated by reference.

At least one manufacturing advantage is realized by the fact that opposing surfaces on the top/bottom portions of the assembly 20 are mirror-images of each other. Hence, regardless of the actual manufacturing technique used, e.g., grinding, machining, or EDM processes, the two corresponding opposing surfaces can be manufactured at the same time using the same equipment. For example, the bottom surface of top portion 28 and the top surface of the bottom portion 30 illustrated in FIGS. 5 and 6 can be manufactured at the same time by securing two metal blanks side by side, and corresponding pairs of semi-circular grooves 34a and 34b or 32a and 32b are created by the EDM wire or by the blade of a cutting tool across the two metal blanks. This ensures that any one pair of grooves is properly cut and positioned on the metal blanks. As discussed above and illustrated in FIGS. 5, 7, and 8, the through holes 42 and 44 provided on the metal blanks are dimensioned and configured to receive fasteners, such as screws or bolts and nuts, to secure the metal blanks together. The holes 42,44 may have countersinks (not shown) for the fasteners that hold the top and bottom portions 28,30 together during the EDM or machining process.

By utilizing only a small number of components to construct the guide block assembly while still employing the "small hole technology," the present invention is able to avoid the drawbacks of the conventional V-shaped open groove method, and accomplishes the same objectives as Dean et al. at lower costs.

Figure 11:
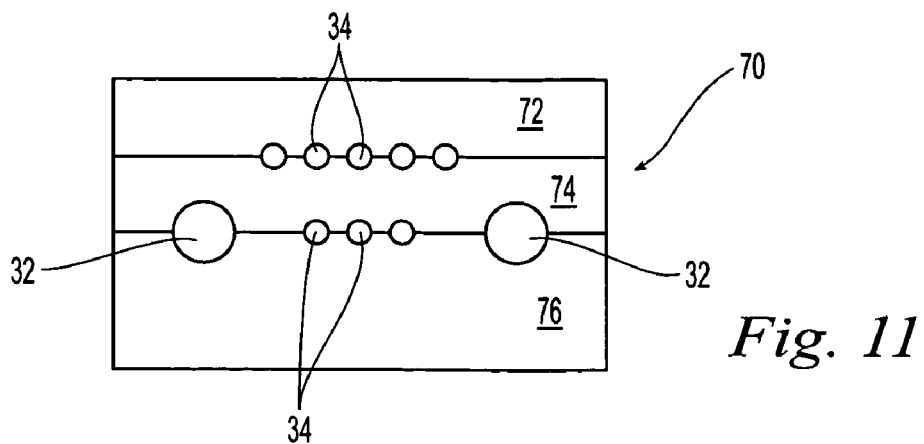
FIG. 11 is a front view of another alternative embodiment of the present invention.
Figure 12:
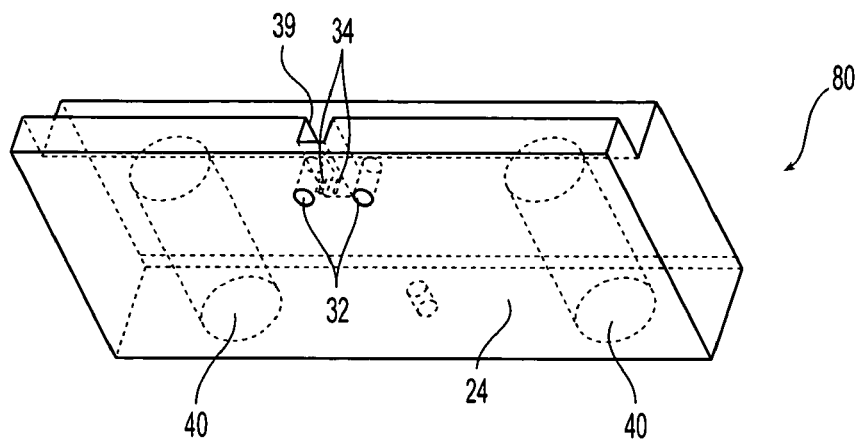
FIG. 12 is a perspective front view of another embodiment of the present invention.
Figure 13:
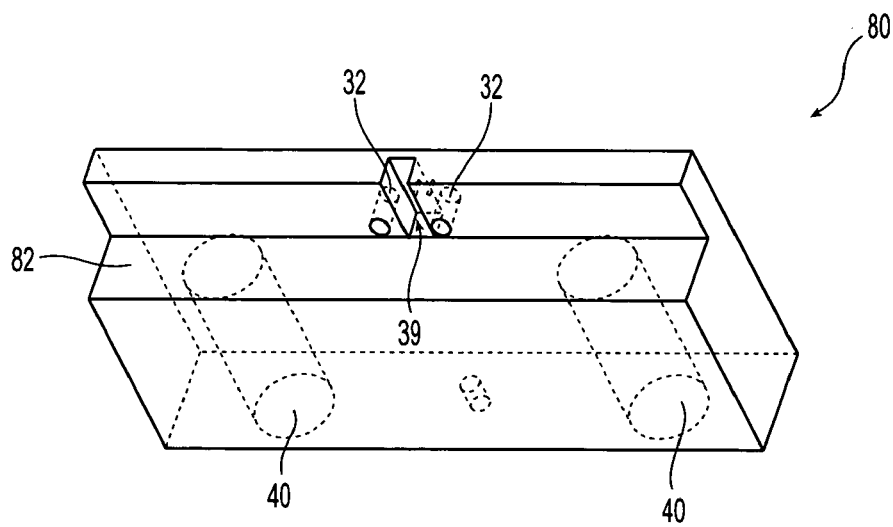
FIG. 13 is a perspective back view of the embodiment shown in FIG. 12.
Figure 14:
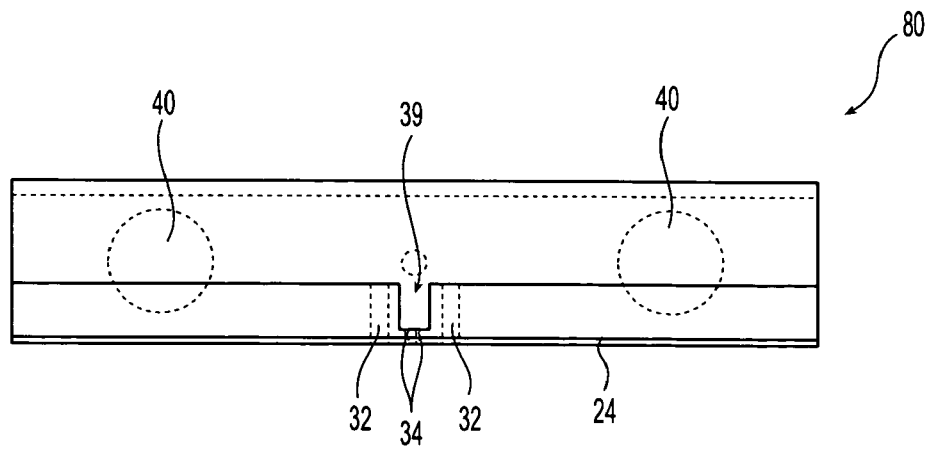
FIG. 14 is a top view of the embodiment shown in FIGS. 12 and 13.
Figure 15A:
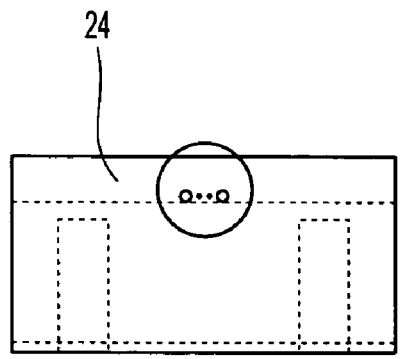
FIG. 15A is a front view of the embodiment shown in FIGS. 12, 13 and 14.
Figure 15B:
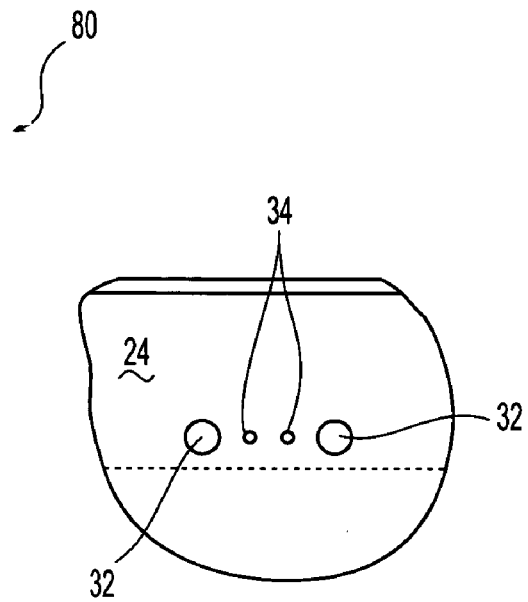
FIG. 15B is an enlarged view of a portion of FIG. 15A.

It will also be noted that although only two semi-circular fiber grooves 34*a,b* on the top and bottom portions are illustrated in FIG. 5, any number of fiber grooves can be machined on the top and bottom portions. Furthermore, although only one row of fiber bores is shown on guide block assembly 20, the present invention may have any number of rows, as shown in FIG. 11. The guide block assembly 70 may have a plurality of rows of fiber bores, for example two rows of fiber bores. Assembly 70 comprises three portions: a top portion 72, a middle portion 74 and a bottom portion 76. In this example, top portion 72 defines five semi-circular fiber grooves on its lower surface to correspond with the five semi-circular fiber grooves on the top surface of the middle portion 74. Middle portion 74 in turn has three semi-circular fiber grooves and two semi-circular guide pin bore grooves defined on its lower surface to correspond to the three semi-circular fiber grooves and two semi-circular guide pin bore grooves defined on the top surface of the bottom portion 76. Hence when the three portions of assembly 70 are assembled, a first row of five fiber bores and a second row of three fiber bores disposed between two guide pin bores are formed, as shown. In accordance with the present invention, any number of rows of any number of bores can be formed and the guide pin bores can be located on any row using the manufacturing processes described above. For example, the bottom surface of top portion 72 and top surface of middle portion 74 can be fabricated at the same time, and the bottom surface of middle portion 74 and top surface of bottom portion 76 can be fabricated at the same time.

Figure 10:
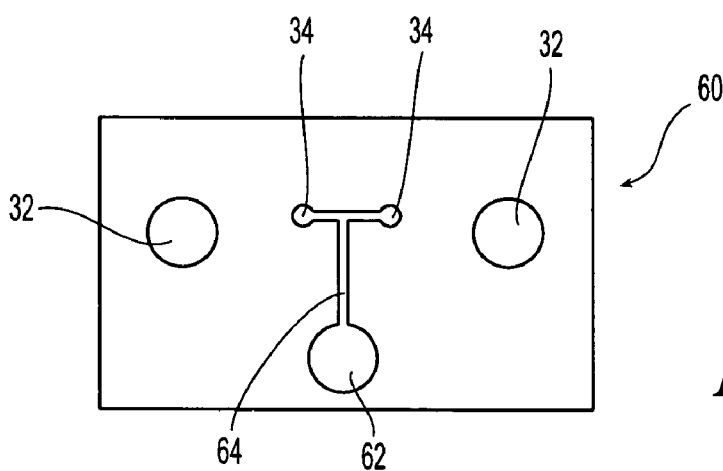
FIG. 10 is a front view of an alternative embodiment of the present invention.

Alternatively, the guide block assembly can be fabricated from a single block as shown in FIG. 10 to further reduce the costs of fabricating the guide block assembly. Using the wire EDM process, after a starter bore 62 is first created by conventional techniques such as drilling, the EDM wire may be inserted in the starter hole and the cut a path 64 to form fiber bores 34. Path 64 may then be filled with a high temperature epoxy. Guide pin bores 32 may be drilled as shown, or path 64 may extend from fiber bores 34 to create guide pin bores 32.

In accordance with another aspect of the invention, another unitary guide block assembly 80 is shown in FIGS. 12–15. Guide block assembly 80 is made from a single block of material. Unlike the guide block assembly 60 discussed above, guide block assembly 80 does not require the EDM wire to form path 64 to connect the fiber bores and/or guide pin bores together, and therefore obviates the needs to back fill path 64 with epoxy. As shown, unitary guide block assembly 80 has relief cavity 39 disposed behind fiber bores 34, as described above. Similar to guide block assembly 20, assembly 80 also has guide pin bores 32 disposed to the outside of fiber bores 34, and receiving channels 40 sized and dimensioned to received corresponding bosses on the mold cavity (not shown), such that the guide block assembly can be securely affixed onto the mold cavity, as discussed above and as illustrated in FIG. 4. Assembly 80 also has front face 24, which serves as one of the walls of mold cavity 22.

The advantages of unitary guide block assemblies 80 and 60 over guide block assembly 20 include the elimination of a number of components, such as key pin bore 35 and key pin 37 to align the two halves of the guide block assembly, through holes 42 and 44 to clamp the halves together during the manufacturing process, and the vertical channels 36*a* and 36*b* to clamp the halves together during the ferrule molding process. Additionally, the lapping process to ensure proper alignment of the fiber bore grooves is also not necessary.

Guide block assembly 80 is preferably manufactured by a novel EDM manufacturing process. First, the relief cavity 39 is cut by conventional method in the blank block. An additional relief channel 82 may be provided behind relief cavity 39. Next, a series of starter holes is fashioned into the blank. One starter hole is prepared for each guide pin bore 34 and for each fiber bore 32. Due to the relative sizes of these bores, the starter holes for the guide pin bores can be larger than the starter holes for the fiber bores. The starter holes are formed by a single EDM wire, which is connected to the EDM machine only at one end. The free end of the EDM wire is positioned at the desired location and electrical discharges are emitted therefrom to create the starter holes. Advantageously, the starter holes for the fiber bores 34 are located opposite from relief cavity 39, where the width of the blank is thinnest, which, in addition to preventing flash build-up, also facilitates the creation of the starter holes. After the starter holes are made, a longer continuous feed EDM wire is threaded through each starter hole. This longer wire is then connected to the EDM machine at both end and the electrical discharges from this longer wire are emitted to enlarge the starter hole until the hole reaches the desired size of the fiber bore 32. Advantageously, the blank block remains clamped to the EDM machine during the entire manufacturing process, thereby eliminating possible location and sizing errors due to handling and repositioning of the blank. The starter holes for the guide pin bores 34 may also be created the same way. Due to the relative larger size of the guide pin bores, their starter hole may also be created by conventional methods, such as drilling.

The starter-hole EDM wire typically is 0.0020–0.0025 inch in diameter and 3 mm (0.12 inch) in length. As described above, EDM wires are typically made from zinc coated brass, molybdenum, or tungsten. Due to the relative shortness of the wire, it can be formed rigid and straight, which increase the accuracy of the position and orientation of the starter holes. As a result, the fiber holes 32 made in accordance with this EDM wire method extend in a precise straight line and running perpendicular to the front surface 24 of the unitary guide block assembly 80.

Several advantages directly flow from this EDM wire method. First, due to the ability to pin point the starter hole and then create straight fiber bores, the radial offset between corresponding optical fibers from two adjoining ferrules made in accordance with this method has been reduced to ¼ μm for single mode fibers and ½ μm for multi mode fibers. As discussed above, single mode fiber use only a relatively small portion of the fiber's cross-section for signal transmission, while multi-mode fibers use more of the fiber's cross-section. For example, a single mode fiber uses approximately 9 μm section of a 125 μm optical fiber, while a multi-mode fiber uses approximately 50–60 μm of the 125

µm optical fiber. Hence, tight control of the radial offset between connecting optical fibers, particularly a single mode fiber, is desirable and can be achieved by the ferrules made in accordance with the present invention. Furthermore, the radial offset between the fiber bores 32 and the fiber bore forming pins 50 during the molding operation has also been reduced to about ½ µm.

Another advantage realized from the EDM wire method is that due to the more precise perpendicular orientation of the fiber bores 32 relative to the front surface 24 of guide block assembly 80, front surface 24 may have an arcuate surface or other non-rectilinear surfaces milled or otherwise formed thereon, after the fiber bores have been formed while maintaining the precise location of the fiber bores on the milled front surface 24. In other words, if the fiber bores 32 are not precisely oriented perpendicular to front surface 24 when front surface 24 is milled, the location of the fiber bores 32 on the milled surface will shift relative to the location of the fiber bores 32 on the pre-milled surface. This shifting produces inaccurate guide block assemblies, which in turn produces inaccurate placement of the fibers at the front face of the ferrules. The fiber bores 32 may also be formed after the front surface 24 is milled.

Figure 17A:
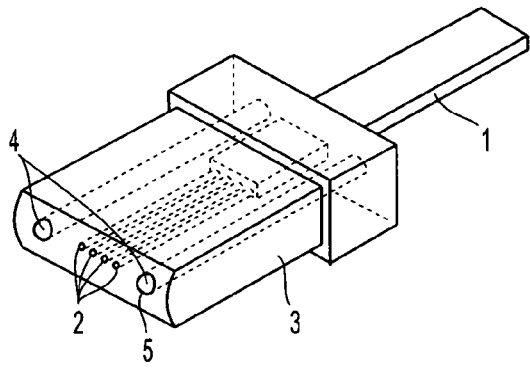
FIGS. 17A–E illustrate variations of the end face of the ferrule produced by embodiments of the guide block assembly of the present invention.
Figure 17B:
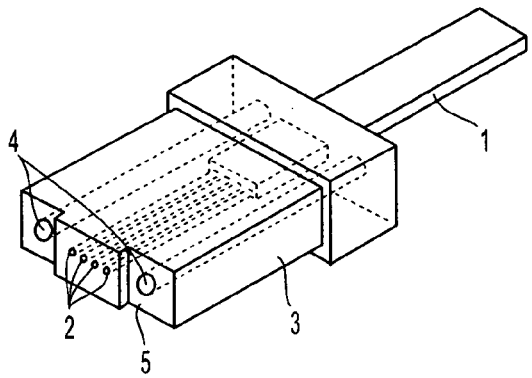
Figure 17C:
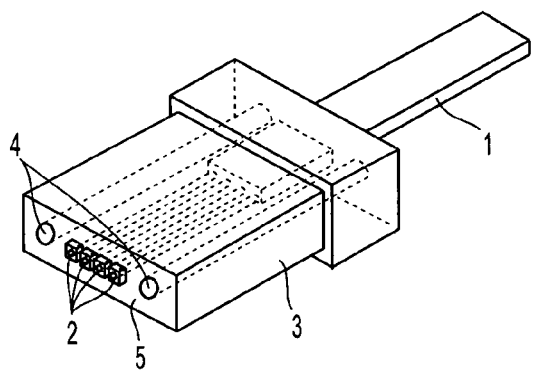
Figure 17D:
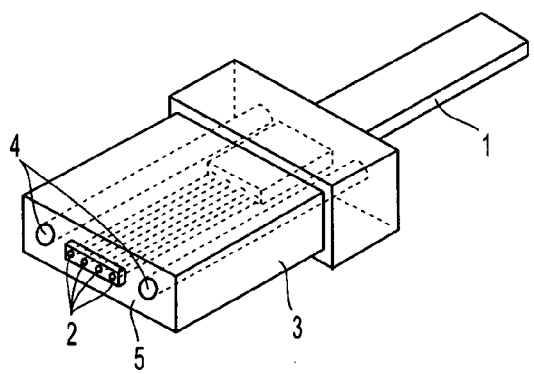
Figure 17E:
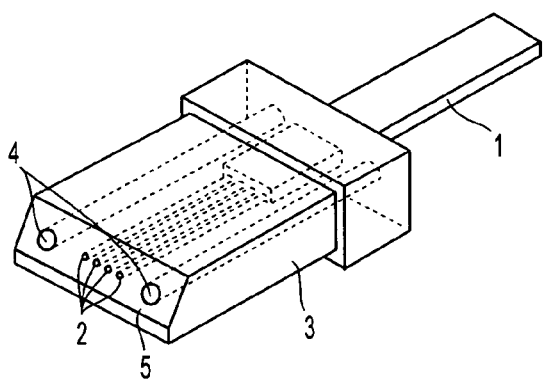
Figure 18A:
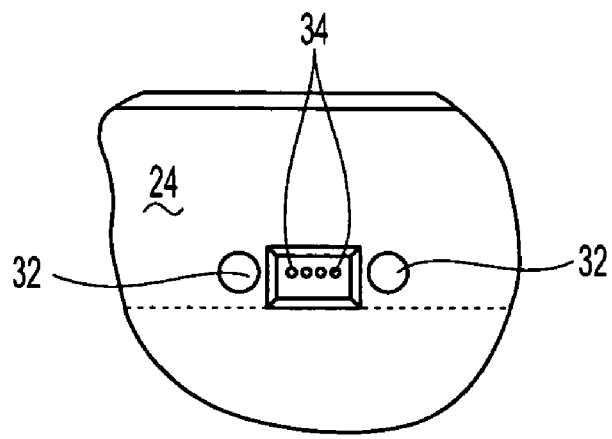
FIGS. 18A–B are enlarged views of a portion of the guide block assembly showing the milled front face.
Figure 18B:
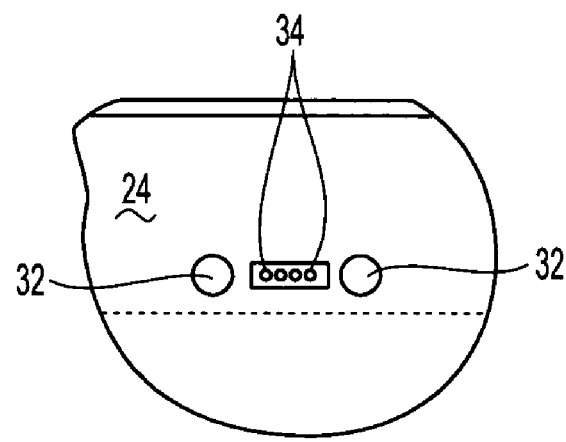

It is known in the art that providing a protruding curve or other non-rectilinear surfaces on the end face 5 of ferrule 3 positions the terminal ends of the optical fibers 2 forward of the ferrule to reduce back reflectance and improve signal transmission between ferrules. Examples of milled front surface 24 are illustrated in FIGS. 18A and 18B. Heretofore, each ferrule is typically ground or polished after molding to achieve the curve surface. A unitary milled guide block assembly in accordance with the present invention obviates the need to grind each ferrule separately, thereby reducing manufacturing costs. In addition to a milled curved front face 24, which produces the curved end face 5 in ferrule 3 shown in FIG. 17A, front face 24 may have other shapes milled thereon to produce other shapes for end face 5. For example, front face 24 may have a step milled therein, shown in FIG. 18A, to produce the stepped face 5 shown in FIG. 17B. Front face 24 may also have individual holes milled around each fiber bore 32 to produce the end face 5 shown in FIG. 17C. Front face 24 may also have an elongated channel milled around all the fiber bores 32, shown in FIG. 18B, to produce the pedestal end face 5 shown in FIG. 17D, and front face 24 may have a slant formed thereon to produce the angled end face 5 shown in FIG. 17E.

Figure 16B:
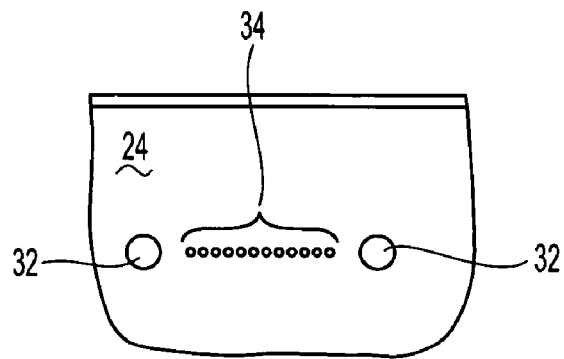
FIG. 16B is an enlarged view of a portion of FIG. 16A.
Figure 16A:
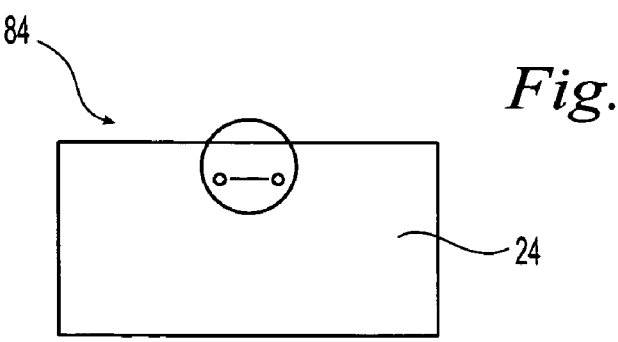
FIG. 16A is a front view of the alternative embodiment of the present invention.

Additionally, while FIGS. 12–15 show the unitary guide block assembly 80 with two fiber bores 32 defined thereon, it may have any number of fiber bores. For example, unitary guide block assembly 84 shown in FIGS. 16A–16B has 12 fiber bores and the ferrules shown in FIGS. 17A–E were made with a guide block assembly defining 4 fiber bores. Hence, this present invention is not limited to any specific number of fiber bores.

In accordance with another aspect of the present invention, a plurality of longitudinal slots may be cut along the periphery of the fiber bores 32 or the guide pin bores 34 to reduce the wear and tear on the fiber bore forming pins 50 and the guide pin bore forming pins 51. While it remains desirable to evenly distribute the contact between the pins and the bores during the molding process as discussed above, it is also advantageous to reduce the contact areas between these two components. Preferably, four longitudinal slots disposed along the bores reduce such contact areas.

While various descriptions of the present invention are described above, it is understood that the various features of the present invention can be used singly or in combination thereof. Therefore, this invention is not to be limited to the specifically preferred embodiments depicted therein.

What is claimed is:

1. A guide block assembly for aligning and retaining at least one fiber bore forming pin and at least one guide pin bore forming pin within a mold cavity, said assembly comprising a unitary member made from a single block of a rigid material and defining at least one fiber bore and at least one guide pin bore, wherein said at least one fiber bore is created by an electric discharge machining (EDM) wire, said unitary member comprising a mold face adjacent the mold cavity and a relief cavity disposed opposite said mold face, said at least one fiber bore extending in a lengthwise direction between said mold face and said relief cavity.

2. The guide block assembly of claim 1, wherein said at least one fiber bore is formed by creating a starter hole with a first EDM wire and enlarging said starter hole with a second EDM wire.

3. The guide block assembly of claim 2, wherein the first EDM wire is connected to an EDM machine at one end and wherein the second EDM wire is connected to the EDM machine at both ends.

4. The guide block assembly as set fort in claim 1, wherein the at least one fiber bore has a length and a diameter and wherein a ratio between the length of the at least one fiber bore to its diameter is approximately 3:1 to 10:1.

5. The guide block assembly as set forth in claim 4, wherein the ratio between the length of the at least one fiber bore to its diameter is approximately 4:1 to 8:1.

6. The guide block assembly as set forth in claim 5, wherein the ratio between the length of the at least one fiber bore to its diameter is approximately 6:1.

7. A guide block assembly for aligning and retaining a plurality of fiber bore forming pins, said assembly comprising a unitary member made from a single block of a rigid material and defining a corresponding plurality of fiber bores, each of said fiber bores created by an electric discharge machining (EDM) wire, said unitary member comprising a front face and a relief cavity disposed opposite said from face, each of said fiber bores extending in a lengthwise direction between said front face and said relief cavity, said relief cavity being in communication with each of said fiber bores.

8. The guide block assembly of claim 7, wherein each of said fiber bores is formed by creating a starter hole with a first EDM wire and enlarging said starter hole with a second EDM wire.

9. The guide block assembly of claim 8, wherein the first EDM wire is connected to an EDM machine at one end and wherein the second EDM wire is connected to the EDM machine at both ends.

10. The guide block assembly as set forth in claim 7, wherein each of said fiber bores has a length and a diameter and wherein a ratio between the length of each fiber bore to its diameter is approximately 3:1 to 10:1.

11. The guide block assembly as set forth in claim 10, wherein the ratio between the length of each fiber bore to its diameter is approximately 4:1 to 8:1.

12. The guide block assembly as set forth in claim 11, wherein the ratio between the length of each fiber bore to its diameter is approximately 6:1.

* * * * *